United States Patent
Yang et al.

(10) Patent No.: US 12,283,031 B2
(45) Date of Patent: Apr. 22, 2025

(54) METHOD AND APPARATUS FOR REMOVING HONEYCOMB ARTIFACTS FROM OPTICAL FIBER BUNDLE IMAGES BASED ON ARTIFICIAL INTELLIGENCE

(71) Applicant: KOREA INSTITUTE OF SCIENCE AND TECHNOLOGY, Seoul (KR)

(72) Inventors: Sungwook Yang, Seoul (KR); Eunchan Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 408 days.

(21) Appl. No.: 17/742,027

(22) Filed: May 11, 2022

(65) Prior Publication Data

US 2023/0105073 A1   Apr. 6, 2023

(30) Foreign Application Priority Data

Oct. 5, 2021   (KR) ........................ 10-2021-0131537

(51) Int. Cl.
 *G06T 5/80*   (2024.01)
 *G02B 6/06*   (2006.01)
 *G06T 3/40*   (2006.01)

(52) U.S. Cl.
 CPC ............... *G06T 5/80* (2024.01); *G02B 6/065* (2013.01); *G06T 3/40* (2013.01); *G06T 2207/20084* (2013.01)

(58) Field of Classification Search
 None
 See application file for complete search history.

(56) References Cited

U.S. PATENT DOCUMENTS

| | | |
|---|---|---|
| 6,157,748 A | 12/2000 | Taleblou et al. |
| 7,646,938 B2 | 1/2010 | Berier et al. |

(Continued)

FOREIGN PATENT DOCUMENTS

| | | |
|---|---|---|
| KR | 10-2019-0058285 A | 5/2019 |
| KR | 10-2020-0070321 A | 6/2020 |

(Continued)

OTHER PUBLICATIONS

Wang, Pu, et al. "Fiber pattern removal and image reconstruction method for snapshot mosaic hyperspectral endoscopic images." Biomedical optics express 9.2 (2018): 780-790.

(Continued)

*Primary Examiner* — Leon Viet Q Nguyen
(74) *Attorney, Agent, or Firm* — NSIP Law

(57) ABSTRACT

Provided are an apparatus and method for honeycomb artifacts removal for removing honeycomb artifacts in images received from an optical fiber imaging device through a honeycomb artifact removal model. The honeycomb artifact removal apparatus according to an embodiment includes a control unit configured to create a training dataset, build the honeycomb artifact removal model with the created training data, remove a honeycomb artifact in an input image through the built honeycomb artifact removal model and output a corrected image, wherein the control unit is configured to perform preprocessing of a raw image, acquire a honeycomb artifact image through the optical fiber imaging device, and synthesize the preprocessed raw image with the honeycomb artifact image to generate a honeycomb artifact synthesized image, and the training dataset is created by mapping the honeycomb artifact synthesized image as input data and the preprocessed raw image as output data.

8 Claims, 11 Drawing Sheets

(56) References Cited

U.S. PATENT DOCUMENTS

| | | | |
|---|---|---|---|
| 7,801,405 | B2 | 9/2010 | Daum et al. |
| 8,218,901 | B2 | 7/2012 | Vercauteren et al. |
| 8,600,134 | B2 | 12/2013 | Vercauteren et al. |
| 10,891,730 | B1 | 1/2021 | Wang et al. |
| 2009/0237498 | A1 | 9/2009 | Modell et al. |
| 2019/0156524 | A1 | 5/2019 | Park et al. |
| 2019/0209015 | A1* | 7/2019 | Liang ..................... A61B 1/07 |
| 2020/0241277 | A1 | 7/2020 | Shao et al. |
| 2021/0097661 | A1 | 4/2021 | Palo et al. |
| 2021/0241117 | A1* | 8/2021 | Wang ..................... G06N 3/04 |
| 2021/0358092 | A1* | 11/2021 | Mironica ................ G06T 7/337 |
| 2022/0207728 | A1* | 6/2022 | Rittscher ................. G06T 5/73 |

FOREIGN PATENT DOCUMENTS

| | | |
|---|---|---|
| KR | 10-2318194 B1 | 10/2021 |
| WO | WO 2021/198082 A1 | 10/2021 |

OTHER PUBLICATIONS

Shao, Jianbo, et al. "Fiber bundle image restoration using deep learning." Optics letters 44.5 (2019): 1080-1083.

* cited by examiner

FIG. 8

| Method | $s$ | $r$ | $q$ | |
|---|---|---|---|---|
| | | | $\gamma = 0.5$ | $\gamma = 0.8$ |
| Raw | 0 | 0.4654 | 0.2327 | 0.0931 |
| Median ($f = 7$) | 0.6610 | 0.2880 | 0.4745 | 0.5864 |
| Gaussian ($\sigma = 3$) | 0.7725 | 0.2821 | 0.5273 | 0.6744 |
| Interpolation | 0.7509 | 0.4044 | 0.5886 | 0.6992 |
| HAR-CNN | 0.7758 | 0.4569 | 0.6164 | 0.7120 |

METHOD AND APPARATUS FOR REMOVING HONEYCOMB ARTIFACTS FROM OPTICAL FIBER BUNDLE IMAGES BASED ON ARTIFICIAL INTELLIGENCE

DESCRIPTION OF GOVERNMENT-SPONSORED RESEARCH AND DEVELOPMENT

This research (Development and system integration of a multifunctional handheld surgical robot for micro-precision surgery of intractable brain tumors, Project Serial No.: 1711131233, detailed Serial No.: 2019M3A9E2061784) is done in support of Ministry of Science and ICT, Bio-Medical Technology Development (R&D).

CROSS-REFERENCE TO RELATED APPLICATION

This application claims priority to Korean Patent Application No. 10-2021-0131537, filed on Oct. 5, 2021, and all the benefits accruing therefrom under 35 U.S.C. § 119, the contents of which in its entirety are herein incorporated by reference.

BACKGROUND

1. Field

The present disclosure relates to a method and apparatus for removing honeycomb artifacts in images based on artificial intelligence for efficient removal of honeycomb artifacts in images using an artificial intelligence model.

2. Description of the Related Art

Optical fiber imaging devices (fiber bundle endomicroscopy) have high flexibility and a miniaturized structure, and are widely used in in-vivo and in-situ optical diagnosis applications. FIG. 1 schematically shows the structure of the optical fiber imaging device. The optical fiber imaging device includes multiple lenses, a fiber bundle and a camera. Light reflected from an object moves to the fiber bundle through the lens, and the camera generates an image through the light transmitted through the fiber bundle. Here, the fiber bundle includes multiple optical fibers, and a void corresponding to an empty space is formed between the optical fibers. The void is found as an artifact such as a honeycomb artifact in the image generated by the camera. The honeycomb artifact in the image degrades the overall quality of the image, and acts as a factor that hampers accurate diagnosis.

To remove the honeycomb artifact in the image, spatial filtering methods such as Median/Gaussian Filter have been proposed, but pattern removal methods through filters cause image distortion and reduce the image contrast.

Additionally, suggestions have been made for honeycomb artifact removal methods based on interpolation which find a core pixel region and interpolates a void pixel corresponding to the honeycomb artifact based on the core pixel region to preserve the pixel intensity of the image, but the results change sensitively depending on the location detection accuracy of the core pixel, which makes it impossible to robustly respond to movement and rotation changes of the honeycomb artifact.

SUMMARY

The present disclosure is directed to providing a method and apparatus for removing honeycomb artifacts in images based on artificial intelligence for efficient removal of honeycomb artifacts in images using an artificial intelligence model.

The present disclosure is further directed to providing a method and apparatus for removing honeycomb artifacts in images for robustly responding to movement and rotation changes of honeycomb artifacts without reducing the image contrast.

The objects of the present disclosure are not limited to the above-mentioned objects, and other objects and advantages of the present disclosure not mentioned herein will be apparent from the following description, and will be understood by the embodiments of the present disclosure more clearly. Additionally, it will be easily understood that the objects and advantages of the present disclosure can be realized by the means set forth in the appended claims and a combination thereof.

A honeycomb artifact removal apparatus according to an embodiment of the present disclosure includes a control unit configured to create a training dataset, build a honeycomb artifact removal model with the created training data, remove a honeycomb artifact in an input image through the built honeycomb artifact removal model and output a corrected image, wherein the control unit is configured to perform preprocessing of a raw image, acquire a honeycomb artifact image through the optical fiber imaging device, and synthesize the preprocessed raw image with the honeycomb artifact image to generate a honeycomb artifact synthesized image, and the training dataset is created by mapping the honeycomb artifact synthesized image as input data and the preprocessed raw image as output data.

A honeycomb artifact removal method according to an embodiment of the present disclosure is a method for removing honeycomb artifacts in images received from an optical fiber imaging device through a honeycomb artifact removal model, and the method includes creating training data; building the honeycomb artifact removal model with the created training data; and removing a honeycomb artifact in an input image through the built honeycomb artifact removal model and outputting a corrected image, wherein creating the training data comprises performing preprocessing of a raw image, acquiring a honeycomb artifact image through the optical fiber imaging device, and synthesizing the preprocessed raw image with the honeycomb artifact image to generate a honeycomb artifact synthesized image, and the training dataset is created by mapping the honeycomb artifact synthesized image as input data and the preprocessed raw image as output data.

A recording medium according to an embodiment of the present disclosure is a computer-readable recording medium having computer-readable instructions stored thereon, wherein when the instructions are executed by at least one processor, the instructions enable the at least one processor to perform the steps of: creating training data; building a honeycomb artifact removal model with the created training data; and removing a honeycomb artifact in an input image through the built honeycomb artifact removal model and outputting a corrected image, wherein creating the training data comprises performing preprocessing of a raw image, acquiring a honeycomb artifact image through the optical fiber imaging device, and synthesizing the preprocessed raw image with the honeycomb artifact image to generate a honeycomb artifact synthesized image, and the training dataset is created by mapping the honeycomb artifact synthesized image as input data and the preprocessed raw image as output data.

The apparatus and method for removing honeycomb artifacts according to an embodiment of the present disclosure may provide end-to-end mapping from optical fiber bundle images to honeycomb artifact-free images through the honeycomb artifact removal model, and provide the improved performance in honeycomb artifact removal, real-time detail preservation and image mosaicking for the wider field of view of optical fiber bundle images compared to the existing other methods.

The apparatus and method for removing honeycomb artifacts according to an embodiment of the present disclosure may overcome the limitation of the spatial and spectral filtering method which makes both artifacts and sampling patterns blurry, and may also overcome the limitation of the interpolation based method by robustly responding to changes in core locations of optical fiber bundles.

The apparatus and method for removing honeycomb artifacts according to an embodiment of the present disclosure may reduce the burden of setting additional optical hardware for collecting ground truth data in the learning based approach by overlaying and synthesizing honeycomb artifacts with source images in the image database.

BRIEF DESCRIPTION OF THE DRAWINGS

FIG. 8 shows the measurement results of smoothness and linear resolution matrices of the images of FIG. 6.

DETAILED DESCRIPTION

Figure 1:
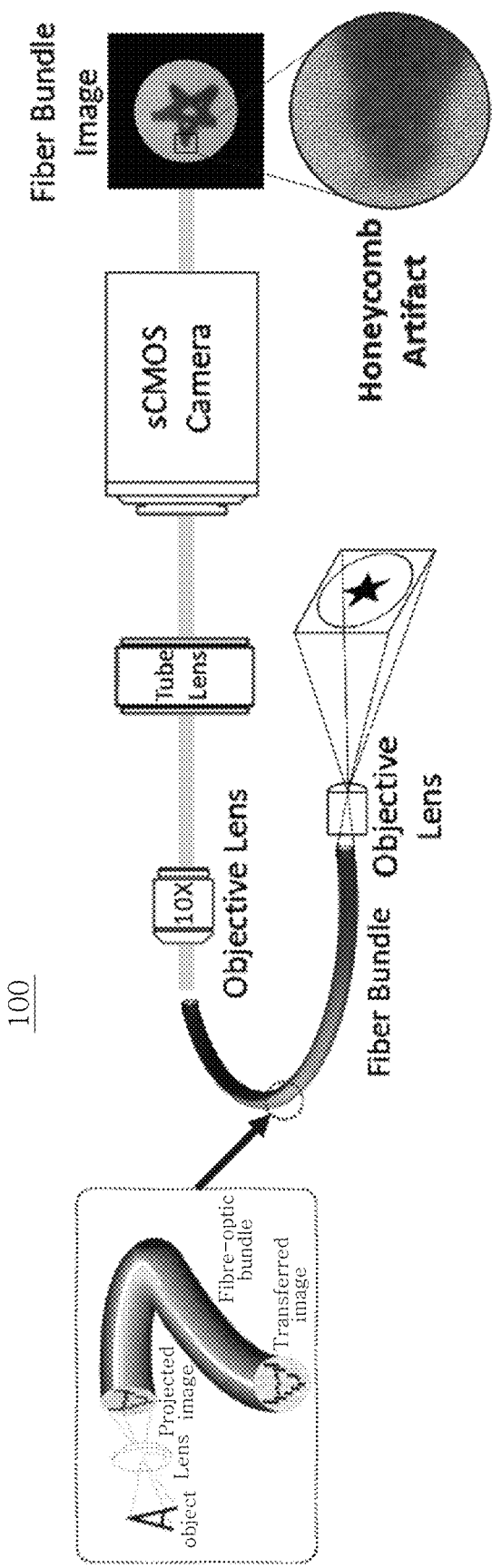
FIG. 1 schematically shows the structure of an optical fiber imaging device.

The advantages and features of the present disclosure, and the methods for achieving them will be apparent with reference to the following embodiments described in detail together with the accompanying drawings. However, the present disclosure is not limited to the disclosed embodiments and may be embodied in many different forms, and these embodiments are provided so that the present disclosure will be thorough and complete and will fully convey the scope of the invention to those skilled in the art, and the present disclosure is defined by the scope of the claims. The same reference numeral indicates the same element throughout the specification.

In describing the embodiments of the present disclosure, when it is determined that a certain description of known functions or elements may unnecessarily obscure the subject matter of the present disclosure, the detailed description is omitted, and the following terms are defined in view of functions in the embodiments of the present disclosure and may change depending on the intention of a user or an operator or the convention. Therefore, the definition should be made based on the disclosure throughout the specification.

Hereinafter, the embodiments of the present disclosure will be described in detail with reference to the accompanying drawings. However, the disclosed embodiments of the present disclosure may be modified in many different forms, and the scope of the present disclosure is not limited to the following embodiments. The embodiments of the present disclosure are provided to deliver a complete and thorough description of the present disclosure to those skilled in the art.

Figure 2:
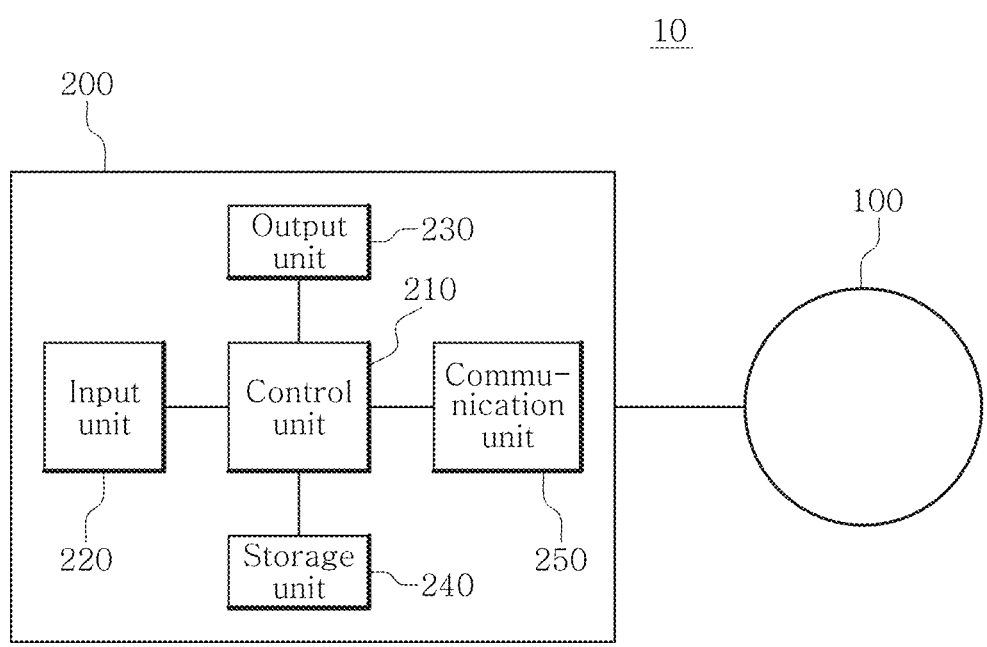
FIG. 2 shows the architecture of an image processing system according to an embodiment of the present disclosure.

FIG. 2 shows the architecture of an image processing system according to an embodiment of the present disclosure. The term 'unit' or ' . . . er' as used herein refers to a processing unit of at least one function or operation, and it may be implemented by hardware or software, or a combination thereof.

Referring to FIG. 2, the image processing system 10 includes an optical fiber imaging device 100 and a honeycomb artifact removal apparatus 200 connected to the optical fiber imaging device 100.

The optical fiber imaging device 100 may be, for example, the conventional optical fiber imaging device of FIG. 1, and may include the above-described elements. The optical fiber imaging device 100 may generate an image of an object through light transmitted from the object through multiple optical fiber bundles. Referring to FIG. 1, since the optical fiber bundles have a circular configuration as a whole, it can be seen that a region of interest corresponding to the optical fiber bundles in the image is shown as circular, and regions outside of the optical fiber bundles are masking processed in black. Additionally, it can be seen that there is a honeycomb artifact in the region of interest due to a void corresponding to an empty space between optical fibers. The generated image is transmitted to the honeycomb artifact removal apparatus 200.

The honeycomb artifact removal apparatus 200 may receive the image from the optical fiber imaging device 100, and process the collected image. The honeycomb artifact removal apparatus 200 may be configured to selectively remove the honeycomb artifact in the collected image and output a honeycomb artifact-free corrected image to a user.

As shown in FIG. 2 the honeycomb artifact removal apparatus 200 may include a control unit 210 to control the entire operation of the honeycomb artifact removal apparatus 200, an input unit 220 to receive an input user command, an output unit 230 to output audio and video, a storage unit 240 to store data and a communication unit 250 to transmit and receive data to/from the optical fiber imaging device 100.

The control unit 210 controls the entire operation of the honeycomb artifact removal apparatus 200. The control unit 210 controls the signal transmission and reception through the communication unit 250. Additionally, the control unit 210 records data in the storage unit 240 and reads the data. The control unit 210 receives images from the optical fiber imaging device 100, processes the images and removes honeycomb artifacts to generate corrected images. The generation of the corrected images may be performed in real time.

The control unit 210 processes the image from the optical fiber imaging device 100 received through the communication unit 250 to generate the corrected image. In this instance, the honeycomb artifact may be removed from the image including the honeycomb artifact based on artificial intelligence. The control unit 210 may use an artificial intelligence algorithm to acquire the corrected image free of honeycomb artifact caused by the void between optical fiber bundles. Examples of the artificial intelligence algorithm include machine learning, neural networks, genes, deep learning and classification algorithms, and the honeycomb artifact may be removed closely to the honeycomb artifact-free image using a honeycomb artifact removal model built by training with data including various honeycomb artifacts through learning using at least one of the artificial intelligence algorithms and datasets free of honeycomb artifacts. The neural network algorithm may include, for example, a convolution neural network (CNN).

The control unit 210 may effectively generate the honeycomb artifact-free image from the image including the honeycomb artifact caused by the void between the optical fiber bundles using the trained honeycomb artifact removal model.

The above-described operation of the control unit 210 may be performed by at least one processor. For example, each of the learning operation for honeycomb artifact removal and the operation of removing the honeycomb artifact based on the learned algorithm may be performed by at least one separate processor, and may be performed by the same processor. Each operation may be performed for each separate software block in the same processor. The control unit 210 may be connected to the input unit 220, the output unit 230, the storage unit 240 and the communication unit 250 to control their entire operation.

The input unit 220 may provide an interface to receive the input user command. For example, the input unit 220 may be provided in various types including a keyboard, a touch panel, a button input device, a mouse, a pen sensor and a microphone. The user input through the input unit 220 may be transmitted to the control unit 210, and by various changes to settings by the control of the control unit 210, the user input may be stored in the storage unit 240 or the related content may be output to the output unit 230.

The output unit 230 outputs information processed by the control unit 210 and information received through the communication unit 250. The output format may be a voice signal, an image signal and a vibration. The output unit 230 may include an audio player to output a voice signal type warning, and a display to output the image signal including various characters and images to the screen. For example, the corrected image may be provided to the user through the output unit 230.

The storage unit 240 stores information necessary for the honeycomb artifact removal apparatus 200 to perform the operation and information generated by performing the operation. The storage unit 240 may store the images collected from the optical fiber imaging device 100 through the communication unit 250, the processed corrected images, the datasets generated for training, and the various settings and determination criteria for honeycomb artifact removal or image processing. The storage unit 240 may be a memory included in the honeycomb artifact removal apparatus 200, but may be an external storage device connected to the honeycomb artifact removal apparatus 200.

The communication unit 250 is wiredly/wirelessly connected to the optical fiber imaging device 100. The communication unit 250 receives the image collected from the optical fiber imaging device 100 connected via a network, and transmits a control command for the optical fiber imaging device 100 from the control unit 210 to the optical fiber imaging device 100.

The honeycomb artifact removal apparatus 200 according to this embodiment may remove the honeycomb artifact from the input image through the honeycomb artifact removal model as described above. However, to train the honeycomb artifact removal model, multiple ground truth images free of honeycomb artifacts are necessary, and to collect them, time, cost and additional hardware devices are required. The honeycomb artifact removal apparatus 200 according to this embodiment may create multiple training data by synthesizing virtual honeycomb artifacts with original images present in the database (the storage unit) 240 without additional hardware for collecting ground truth data, and train the honeycomb artifact removal model based on the training data to remove the honeycomb artifact in the image.

Figure 3:
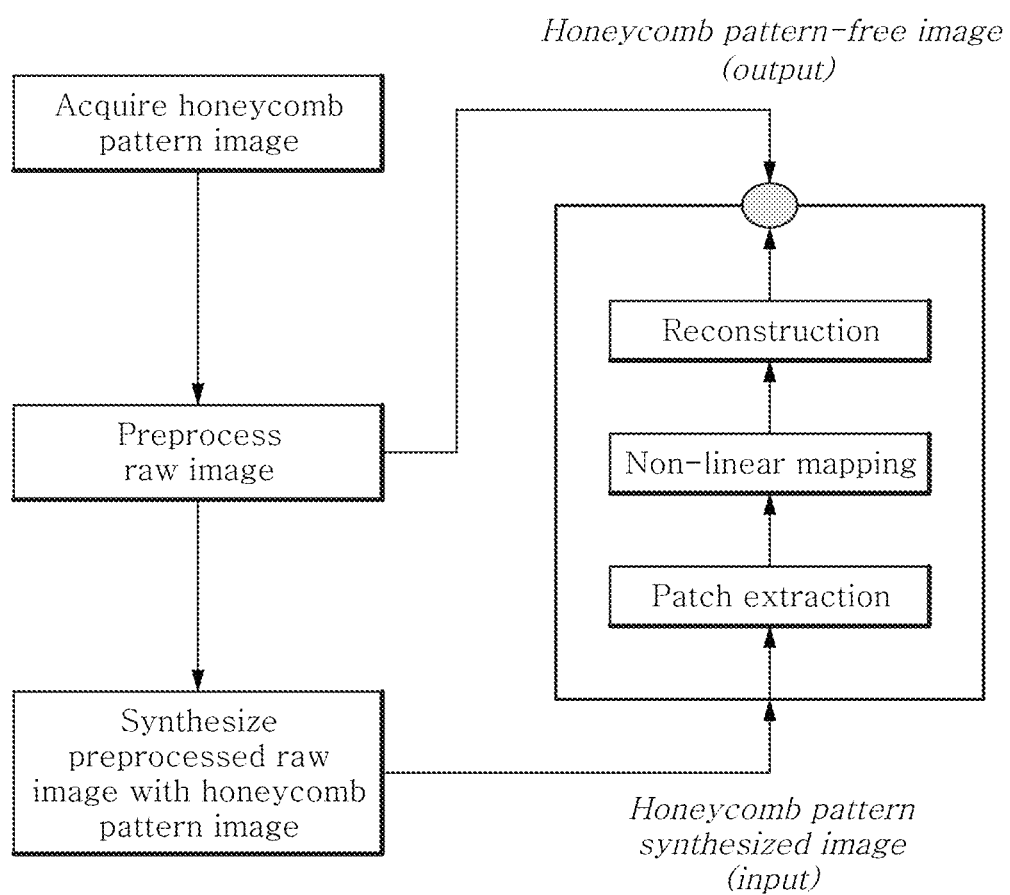
FIG. 3 shows a process of training a honeycomb artifact removal model with honeycomb artifact-introduced training images (honeycomb artifact synthesized images) for training according to an embodiment of the present disclosure.
Figure 4:
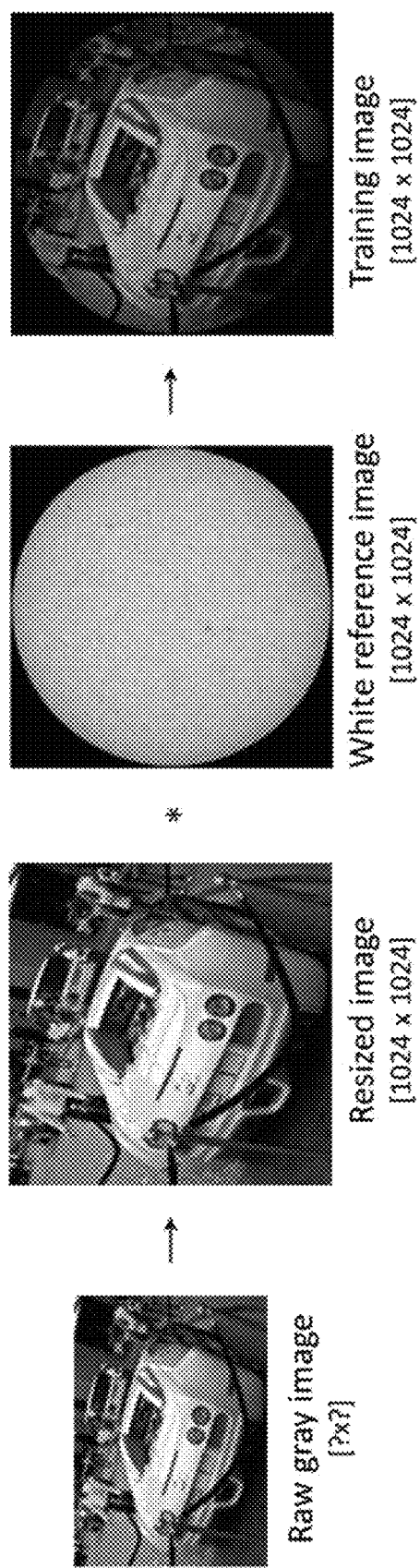
FIG. 4 shows exemplarily a process of converting a source image to a honeycomb artifact synthesized image.
Figure 5:
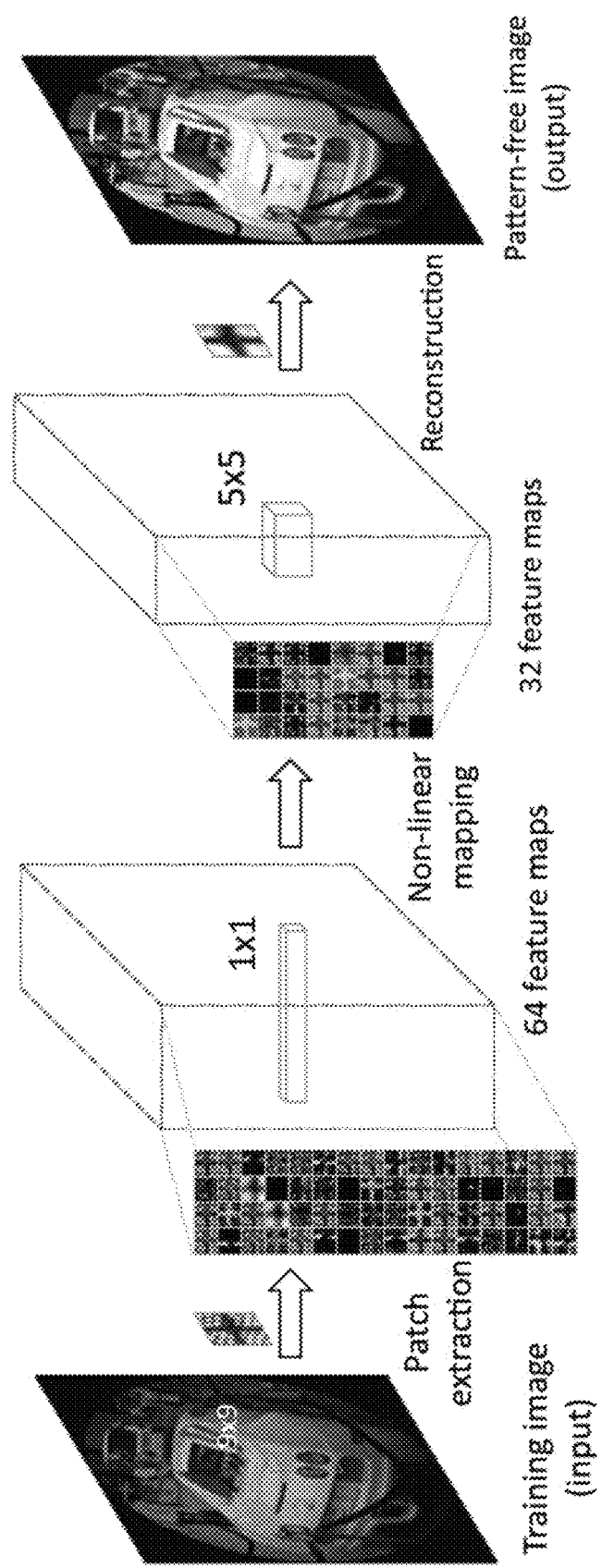
FIG. 5 shows exemplarily a process of training a honeycomb artifact removal model through honeycomb artifact synthesized images.

FIG. 3 shows the process of training the honeycomb artifact removal model with the honeycomb artifact-introduced training images (the honeycomb artifact synthesized images) for training according to an embodiment of the present disclosure. FIG. 4 shows exemplarily the process of converting the source image to the honeycomb artifact synthesized image. FIG. 5 shows exemplarily the process of training the honeycomb artifact removal model through the honeycomb artifact synthesized images.

Referring to FIGS. 3 and 4, the control unit 210 may generate the honeycomb artifact-introduced training image (the honeycomb artifact synthesized image) for training. First, the control unit 210 acquires a honeycomb artifact image. The honeycomb artifact image may be a white reference image generated by capturing an object in a white background through the optical fiber imaging device 100. That is, the honeycomb artifact image is an image including the honeycomb artifact in the white background, and may display the core location of the optical fiber bundle and the void imaging region (the honeycomb artifact region) as bright and dark, respectively. The size of the honeycomb artifact image may be determined based on the specification of the camera of the optical fiber imaging device 100, and the location and number of honeycomb artifacts may be determined based on the specification of the fiber bundles of the optical fiber imaging device 100. The control unit 210 applies a circular binary mask that defines the region of interest to the generated honeycomb artifact image. That is, the region outside of the optical fiber bundle is masking processed in black, and finally the honeycomb artifact synthesized image for synthesis is generated.

The honeycomb artifact removal apparatus 200 includes raw images having no honeycomb artifacts in the storage unit 240. The honeycomb artifact removal apparatus 200 may perform preprocessing of the raw image. When the raw image is a color image, the honeycomb artifact removal apparatus 200 may perform preprocessing to convert to gray scale. The raw image converted to gray scale is preprocessed to resize it so that the size of the raw image matches the size of the honeycomb artifact image. Additionally, the control unit 210 may generate the circular binary mask for the region of interest and apply it to the preprocessed, i.e., resized raw image. The preprocessed raw image may be a honeycomb artifact-free image having no honeycomb artifact. The preprocessed raw image may be ground truth data, and may be used as output data for training the honeycomb artifact removal model.

The control unit 210 synthesizes the preprocessed raw image with the honeycomb artifact image to generate the honeycomb artifact synthesized image. The control unit 210 may synthesize the preprocessed raw image and the honeycomb artifact image pixel by pixel. The honeycomb artifact image may have a normalized value between 0 and 1 to maintain the pixel intensity of the raw image, and the honeycomb artifact synthesized image may be generated by applying the corresponding value to synthesis. The honeycomb artifact synthesized image may be used as input data (training images) for training the honeycomb artifact removal model.

The control unit 210 may create training datasets for training the honeycomb artifact removal model by applying the above-described process to each of the plurality of raw images stored in the storage unit 250. That is, the control unit 210 may perform preprocessing of the raw image, acquire the honeycomb artifact image through the optical fiber imaging device, synthesize the preprocessed raw image with the honeycomb artifact image to generate the honeycomb artifact synthesized image, and create the training dataset by mapping the honeycomb artifact synthesized image as input data and the preprocessed raw image as output data. The created training dataset may be stored in the storage unit 250. The control unit 210 may train the honeycomb artifact removal model through the created training dataset as shown in FIG. 5.

In the present disclosure, the honeycomb artifact removal model may be trained to output the honeycomb artifact-free image by processing the input image. The honeycomb artifact removal model may include a patch extraction layer, a non-linear mapping layer and a reconstruction layer. The patch extraction layer generates an image patch set including a single honeycomb pixel. The non-linear mapping layer is designed to process the non-linearity of the honeycomb artifact by converting a high level vector of the extracted image patch set to a low level vector. The reconstruction layer is configured to reconstruct and output the image through convolution with neighboring pixels, and output an image of a size corresponding to the resolution of the raw image. It is necessary to set an optimal spatial kernel size and an optimal number of feature maps due to a trade-off between speed and performance according to hyperparameter of each layer. In particular, to efficiently remove the honeycomb artifact, it is important to determine the filter size of the patch extraction layer. The filter size of the patch extraction layer needs to be large enough to surround at least one honeycomb artifact, and may be determined, taking the distance between two adjacent cores into account.

For example, in 1024×1024 image size, the distance between two adjacent cores corresponds to about 5-6 pixels. The filter size of the patch extraction layer may be set to 9×9 enough to surround the honeycomb artifact. The filter size of the non-linear mapping layer was set to 1×1 using 64 feature maps, and this may provide sufficient non-linear filtering and high computational efficiency. Finally, the filter size of the reconstruction layer may be set to 5×5 using 32 feature maps. Additionally, the batch size was set to 128, and mean squared error (MSE) was used as a loss function. Rectified Linear Unit (ReLU) was adopted as activation functions of the first and second layers, and training was performed through a gradient descent optimizer.

The control unit 210 stores the built honeycomb artifact removal model in the storage unit 250. The control unit 210 may remove the honeycomb artifact in the input honeycomb bundle image from the optical fiber imaging device 100 using the neural network model to generate a honeycomb bundle corrected image, and provide the honeycomb bundle corrected image to the user. The control unit 210 may further include a graphics processing device for real-time processing, and the removal of the honeycomb artifact in the input raw image may be completed within 10 ms. That is, it is possible to achieve real-time honeycomb artifact removal by performing the honeycomb artifact removal in conjunction with the operation of the optical fiber imaging device 100, and provide a clearer image of the object to the user in real time.

The honeycomb artifact removal model of the honeycomb artifact removal apparatus of the above-described embodiment was built, and a comparative analysis experiment of performance between the built honeycomb artifact removal model and the honeycomb artifact removal method according to the related art was performed. The optical fiber imaging device 100 used in the experiment includes fiber bundles (FIGH-30-650S, Fujikura Ltd.), a 10× objective lens (RMS10X, 0.25 NA, 10.6 mm WD, Olympus Corp.), a tube lens (TTL200. -A, Thorlabs Inc.) and sCMOS camera (Zyla 4.2 PLUS, Oxford Instruments). The fiber bundle includes 30,000 fiber cores and fused silica cladding with the diameter of 650 μm. The tip of the fiber bundle is connected to an aspheric lens (#15-271, Edmund Optics Inc.) having the diameter of 3 mm for field of view (FOV) enlargement to offer the FOV of 2.2 mm at 20 mm distance. The incident light moves from an object through the fiber bundle, and for high speed imaging, imaging is performed by the sCMOS camera with 1024×1024 pixel resolution at 100 Hz. The honeycomb artifact removal apparatus 200 created training data through the above-described process. The honeycomb artifact removal model (HAR-CNN) for removing honeycomb artifacts in input images was implemented by training the honeycomb artifact removal model. A total of 130 images (100 images for training, 30 images for validation) was used to train the HAR-CNN. Subsequently, the training images were decomposed into low rank images with 33×33 size and a stride of 14, and a total of 2,073,600 low rank images was provided to training. The batch size was set to 128, and mean squared error (MSE) was used as a loss function. Rectified Linear Unit (ReLU) was adopted as activation functions of the first and second layers. The network model was trained by a stochastic gradient descent optimizer at the learning rate of 1e-4 for 10,000 epochs using TensorFlow.

Figure 6:
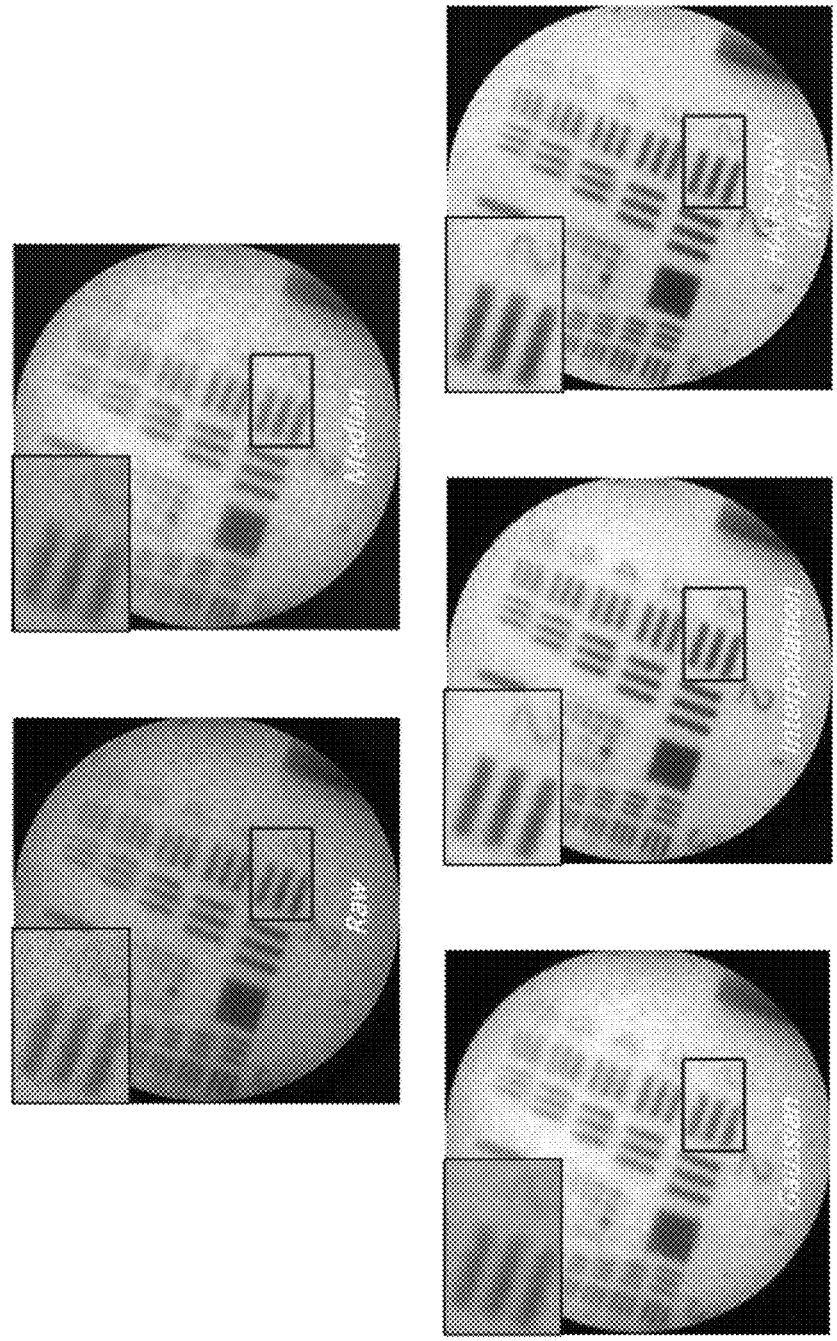
FIG. 6 shows each of a raw image and images free of honeycomb artifacts by the related art and a honeycomb artifact removal model (HAR-CNN) of the present disclosure.

FIG. 6 shows each of the raw image and the images free of honeycomb artifacts by the related art and the honeycomb artifact removal model (HAR-CNN) of the present disclosure.

Referring to FIG. 6, shown is each of the raw image Raw and the images acquired by processing the raw image Raw through each of the Median spatial filter, the Gaussian spatial filter, the interpolation technique, and the honeycomb artifact removal model (HAR-CNN) of the present disclosure. It can be seen through the enlarged view of the raw image Raw that honeycomb artifacts are observed with an eye. In the case of Median, Gaussian, Interpolation and HAR-CNN, it can be seen that honeycomb artifacts are removed so that they cannot be observed with an eye.

Figure 7:
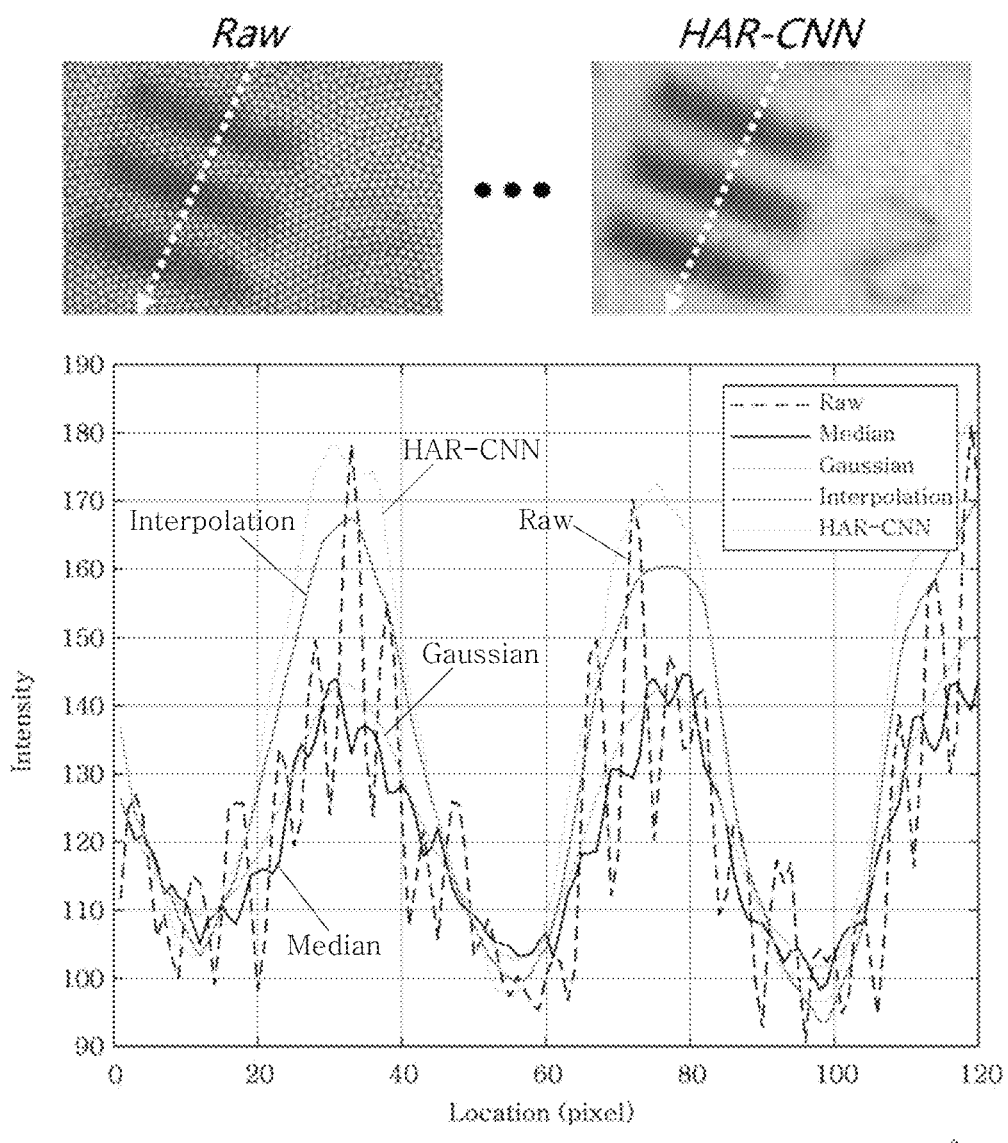
FIG. 7 is a graph showing the comparison results of the measured intensity of the images of FIG. 6.

FIG. 7 is a graph showing the comparison results of the measured intensity of the images of FIG. 6. FIG. 8 shows the measurement results of smoothness and linear resolution matrices of the images of FIG. 6.

The pixel intensity of each image was measured along the direction of the red arrow as shown in FIG. 7, and the results were shown together as a graph. In the case of pixels including honeycomb artifacts, the pixel intensity is lower than neighboring pixels. In the case of the raw image Raw, it can be seen that an intensity change between neighboring pixels is prominently observed. Additionally, in the case of the Median and Gaussian methods, since honeycomb artifacts have been removed, an intensity change between neighboring pixels is not so large, but the overall pixel intensity decreases across the entire image. That is, it can be seen that the overall contrast decreases. In the case of interpolation and HAR-CNN, there is no overall reduction in pixel intensity, and there is no intensity change between neighboring pixels. Additionally, it can be seen that HAR-CNN according to this embodiment shows higher pixel intensity than the interpolation technique. That is, it can be seen that HAR-CNN according to this embodiment outputs the image with high quality by preserving the pixel intensity of the image better than the interpolation technique.

The quantitative performance of the present disclosure can be seen through the smoothness s and linear resolution matrices r of the images shown in FIG. 8. The smoothness corresponds to a quantitative indicator that depicts how well honeycomb artifacts are removed and smoothed, and may be defined as a ratio between variances of the raw image and the reconstructed image. As the deviation of the reconstructed image is smaller, i.e., as the reconstructed image is closer to the raw image, the smoothness s increases. Referring to FIG. 8, it can be seen that HAR-CNN according to this embodiment shows the highest smoothness s value. The Rayleigh based linear resolution indicator r may be applied to assess the method in which each algorithm preserves details after removing honeycomb artifacts. It can be seen that HAR-CNN according to this embodiment also shows the highest linear resolution r corresponding to the detail preserving performance. Additionally, to consider both the honeycomb removal performance and detail preservation, the two matrices s and r are combined to find the weighted quality measurement q as shown in the following Equation 1.

$$q = \gamma \cdot s + (1-\gamma) \cdot r \quad \text{[Equation 1]}$$

($\gamma$ corresponds to a weighting coefficient reflecting s and r.)

It can be seen that in the case of the quality measurement q to which the weighting coefficients of 0.5 and 0.8 are applied, HAR-CNN according to this embodiment also shows the highest value.

Additionally, for lesion detection in the acquired image, it is necessary to distinguish neighboring tissues and tissue-cell stained with specific fluorescence and enhance the contrast of the target to be detected. That is, when honeycomb artifacts are efficiently removed, the background can be effectively removed.

Figure 9:
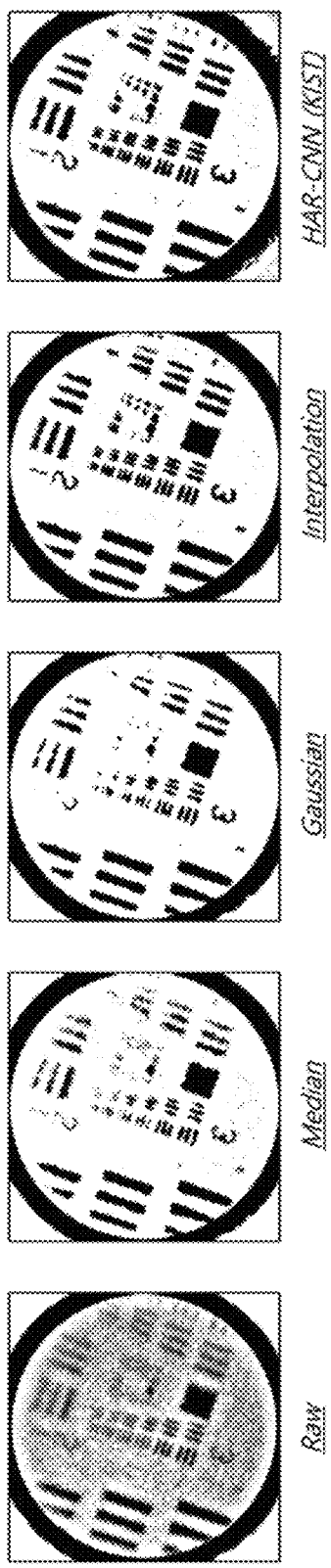
FIG. 9 shows each of the binarization results of the images of FIG. 6.

FIG. 9 shows each of the binarization results of the images of FIG. 6.

Referring to FIG. 9, it can be seen that HAR-CNN according to an embodiment of the present disclosure preserves the target better than the other techniques and effectively removes the background.

Additionally, to visualize the structure of the target to be measured, for example, a lens tissue sample, it is necessary to acquire a plurality of images while moving the optical fiber imaging device having a small FOV, and connect the plurality of images into one by image mosaicing. The common method for image mosaicing involves extracting features (for example, separate edges) and matching the corresponding features in the next frame. Accordingly, for successful image mosaicing in optical fiber bundle imaging, it is necessary to remove honeycomb artifacts. If not so, it is a high likelihood that the fixed and prominent honeycomb artifacts may be recognized as image features rather than the moved sample image, and accurate image mosaicing may be hindered. The image mosaicing performance comparison was also performed between the images using the related art and HAR-CNN according to an embodiment of the present disclosure.

Figure 10:
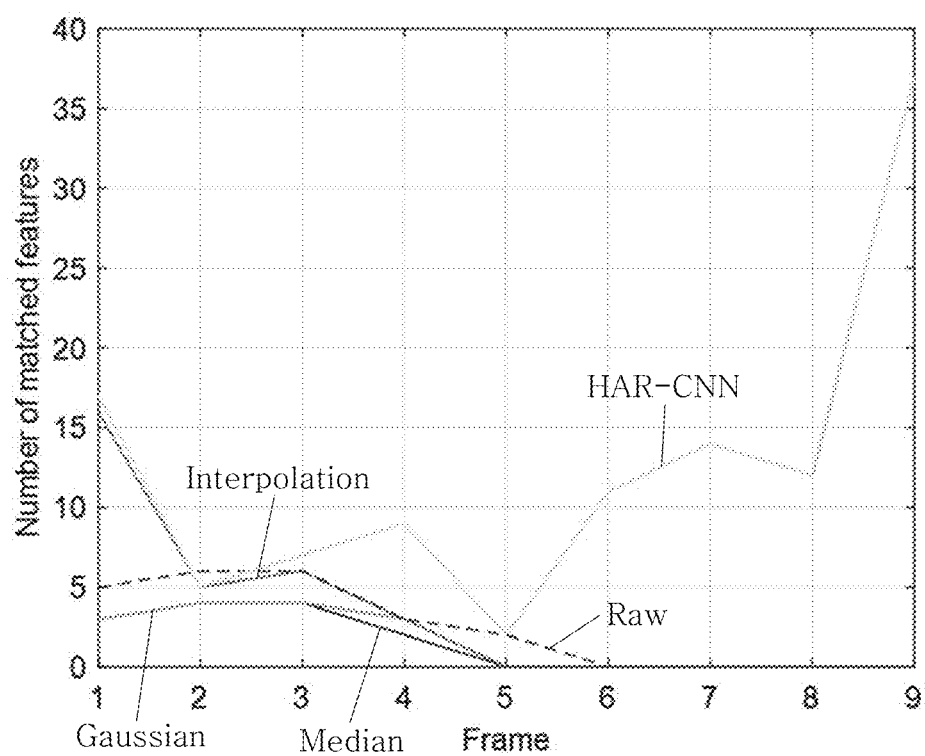
FIG. 10 shows the number of features observed in each of a raw image and images free of honeycomb artifacts by the related art and a honeycomb artifact removal model (HAR-CNN) of the present disclosure.
Figure 11:
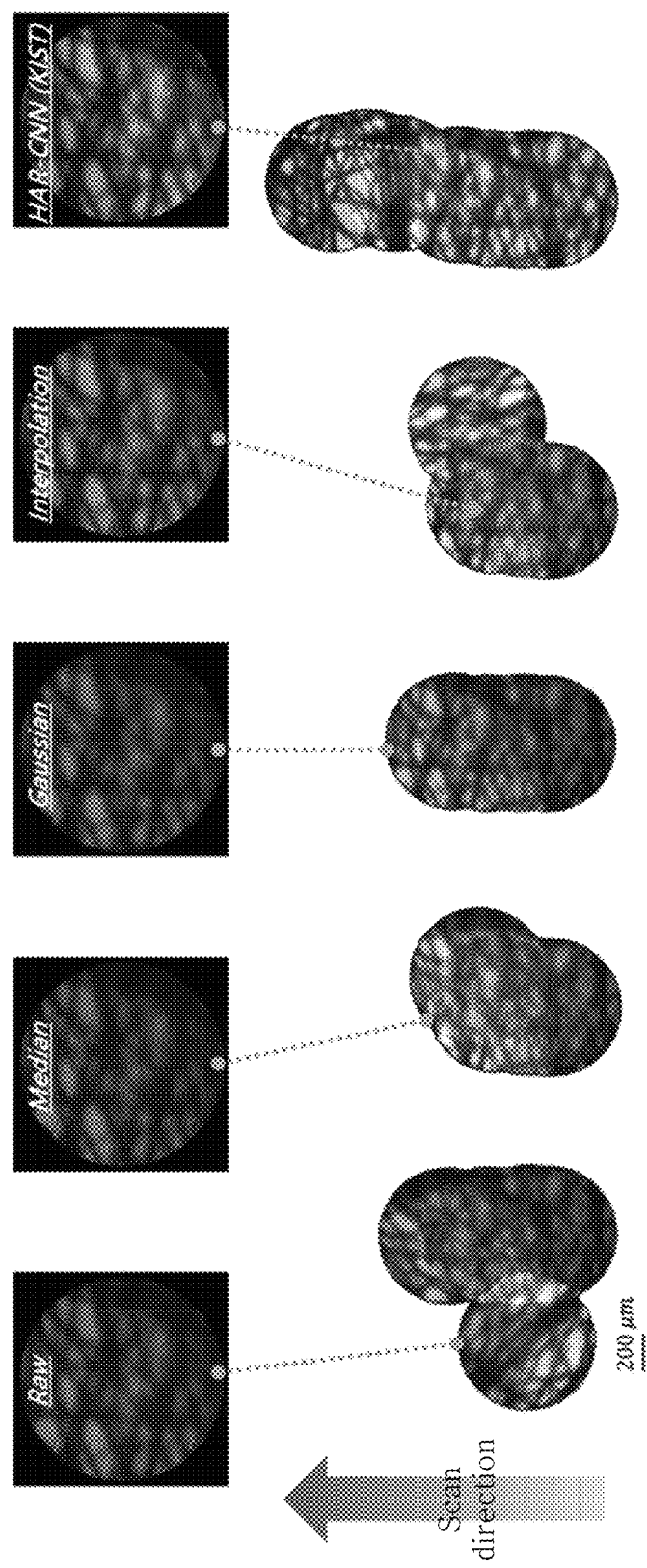
FIG. 11 shows the measurement results of mosaicing performance for each of a raw image and images free of honeycomb artifacts by the related art and a honeycomb artifact removal model (HAR-CNN) of the present disclosure.

FIG. 10 shows the number of features observed in each of the raw image and the images free of honeycomb artifacts by the related art and the honeycomb artifact removal model (HAR-CNN) of the present disclosure. FIG. 11 shows the measurement results of mosaicing performance for each of the raw image and the images free of honeycomb artifacts by the related art and the honeycomb artifact removal model (HAR-CNN) of the present disclosure. The scan direction of the optical fiber imaging device is bottom-up, and the sensed images are connected based on the features and displayed together.

Referring to FIG. 10, it can be seen that the honeycomb artifact removal model (HAR-CNN) according to an embodiment of the present disclosure has a largest number of features collected for each image frame. Referring to FIG. 11, it can be seen that in the case of the honeycomb artifact removal model (HAR-CNN) according to an embodiment of the present disclosure, the images are connected well along the movement direction, but in the case of the related art and the raw image, the connection of the images does not match the movement direction. That is, the honeycomb artifact removal model (HAR-CNN) according to an embodiment of the present disclosure may effectively remove honeycomb artifacts, thereby accurately extracting the features and supporting high performance image mosaicing based on the extracted features.

The honeycomb artifact removal apparatus according to an embodiment of the present disclosure may provide end-to-end mapping from optical fiber bundle images to honeycomb artifact-free images through the honeycomb artifact removal model, and provide the improved performance in honeycomb artifact removal, real-time detail preservation and image mosaicking for the wider field of view of optical fiber bundle images compared to the existing other methods.

The honeycomb artifact removal apparatus according to an embodiment of the present disclosure may overcome the limitation of the spatial and spectral filtering method which makes both artifacts and sampling patterns blurry, and may also overcome the limitation of the interpolation based method by robustly responding to changes in core locations of optical fiber bundles.

The honeycomb artifact removal apparatus according to an embodiment of the present disclosure may reduce the burden of setting additional optical hardware for collecting ground truth data in the learning based approach by overlaying and synthesizing honeycomb artifacts with source images in the image database.

The honeycomb artifact removal method according to an embodiment of the present disclosure is a method for removing honeycomb artifacts in images received from the optical fiber imaging device through the honeycomb artifact removal model, and the method includes creating training data; building the honeycomb artifact removal model with the created training data; and removing a honeycomb artifact in the input image through the built honeycomb artifact removal model and outputting a corrected image.

The above-described method according to an embodiment is performed by the control unit of the honeycomb artifact removal apparatus, and for description of the method according to this embodiment, a reference may be made to FIGS. 1 to 11 and their related description.

In this embodiment, the step of creating the training data may include performing preprocessing of a raw image, and acquiring a honeycomb artifact image through the optical fiber imaging device, and synthesizing the preprocessed raw image and the honeycomb artifact image to generate a honeycomb artifact synthesized image. The honeycomb artifact image may display the core location of the optical fiber bundle and the honeycomb artifact region as bright and dark, respectively.

In this embodiment, the training dataset may be created by mapping the honeycomb artifact synthesized image as input data and the preprocessed raw image as output data.

In this embodiment, the preprocessing of the raw image includes resizing the raw image so that the size of the raw image matches the size of the honeycomb artifact image, and the step of creating the training data may further include applying a circular binary mask to the preprocessed raw image and the honeycomb artifact image.

In this embodiment, the preprocessed raw image and the honeycomb artifact image may be synthesized pixel by pixel to generate the honeycomb artifact synthesized image.

In this embodiment, the honeycomb artifact removal model may be implemented through a convolution neural network. The honeycomb artifact removal model may include a patch extraction layer to generate an image patch set including a single honeycomb pixel, a non-linear mapping layer to process the non-linearity of the honeycomb artifact by converting a high level vector of the image patch set to a low level vector, and a reconstruction layer to reconstruct and output the image through convolution with neighboring pixels.

The honeycomb artifact removal method according to these embodiments may be implemented as an application or in the format of program instructions that may be executed through a variety of computer components and may be recorded in computer readable recording media. The computer readable recording media may include program instructions, data files and data structures alone or in combination.

Examples of the computer readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

The present disclosure has been hereinabove described with regard to the preferred embodiments. Those skilled in the art will understand that the present disclosure may be embodied in modified form without departing from the essential feature of the present disclosure. Therefore, the disclosed embodiments should be considered in a descriptive sense, not a limited sense. The scope of the present disclosure is defined in the appended claims, not the foregoing description, and it should be interpreted that all differences within the equivalent scope fall in the present disclosure.

What is claimed is:

1. A honeycomb artifact removal apparatus for removing honeycomb artifacts in images received from an optical fiber imaging device through a honeycomb artifact removal model, the apparatus comprising:
    a control unit configured to create a training dataset, build the honeycomb artifact removal model with the created training data, remove a honeycomb artifact in an input image through the built honeycomb artifact removal model and output a corrected image,
    wherein the control unit is configured to perform preprocessing of a raw image, acquire a honeycomb artifact image through the optical fiber imaging device, and synthesize the preprocessed raw image with the honeycomb artifact image to generate a honeycomb artifact synthesized image, and
    wherein the preprocessing of the raw image includes resizing the raw image so that a size of the raw image matches a size of the honeycomb artifact image, and
    the control unit is further configured to apply a circular binary mask to the preprocessed raw image or the honeycomb artifact image,
    wherein the training dataset is created by mapping the honeycomb artifact synthesized image as input data and the preprocessed raw image as output data.

2. The honeycomb artifact removal apparatus according to claim 1, wherein the control unit generates the honeycomb artifact synthesized image by synthesizing the preprocessed raw image with the honeycomb artifact image pixel by pixel.

3. The honeycomb artifact removal apparatus according to claim 1, wherein the honeycomb artifact image displays a core location of an optical fiber bundle and a honeycomb artifact region as bright and dark, respectively.

4. The honeycomb artifact removal apparatus according to claim 1, wherein the honeycomb artifact removal model is implemented through a convolution neural network.

5. The honeycomb artifact removal apparatus according to claim 4, wherein the honeycomb artifact removal model comprises:
    a patch extraction layer to generate an image patch set including a single honeycomb pixel,
    a non-linear mapping layer to process non-linearity of the honeycomb artifact by converting a high level vector of the image patch set to a low level vector, and
    a reconstruction layer to reconstruct and output the image through convolution with neighboring pixels.

6. The honeycomb artifact removal apparatus according to claim 1, further comprising:
    a communication unit connected to the optical fiber imaging device via a network;
    a storage unit configured to store information necessary to perform an operation of the honeycomb artifact removal apparatus and information generated by performing the operation;
    an input unit configured to provide an interface which receives input of a user's command; and
    an output unit configured to output the corrected image to the user.

7. A honeycomb artifact removal method for removing honeycomb artifacts in images received from an optical fiber imaging device through a honeycomb artifact removal model, the method comprising:
creating training data;
building the honeycomb artifact removal model with the created training data; and
removing a honeycomb artifact in an input image through the built honeycomb artifact removal model and outputting a corrected image,
wherein creating the training data comprises performing preprocessing of a raw image, acquiring a honeycomb artifact image through the optical fiber imaging device, and synthesizing the preprocessed raw image with the honeycomb artifact image to generate a honeycomb artifact synthesized image, and
wherein the preprocessing of the raw image includes resizing the raw image so that a size of the raw image matches a size of the honeycomb artifact image, and
creating the training data is further configured to apply a circular binary mask to the preprocessed raw image or the honeycomb artifact image,
wherein the training dataset is created by mapping the honeycomb artifact synthesized image as input data and the preprocessed raw image as output data.

8. A non-transitory computer-readable recording medium storing computer-readable instructions, wherein when the instructions are executed by at least one processor, the instructions enable the at least one processor to perform the steps of:
creating training data;
building a honeycomb artifact removal model with the created training data; and
removing a honeycomb artifact in an input image through the built honeycomb artifact removal model and outputting a corrected image,
wherein creating the training data comprises performing preprocessing of a raw image, acquiring a honeycomb artifact image through the optical fiber imaging device, and synthesizing the preprocessed raw image with the honeycomb artifact image to generate a honeycomb artifact synthesized image, and
wherein the preprocessing of the raw image includes resizing the raw image so that a size of the raw image matches a size of the honeycomb artifact image, and
creating the training data is further configured to apply a circular binary mask to the preprocessed raw image or the honeycomb artifact image,
wherein the training dataset is created by mapping the honeycomb artifact synthesized image as input data and the preprocessed raw image as output data.

* * * * *